United States Patent [19]

Kawamura

[11] Patent Number: 4,727,434
[45] Date of Patent: Feb. 23, 1988

[54] IMAGE PROCESSING APPARATUS FOR RAPID PRODUCTION OF A HARD COPY OF A VIDEO IMAGE IN WHICH INPUT IMAGE SIGNAL PROCESSING PARAMETERS ARE SET WHILE A RECORD MEDIUM IS BEING POSITIONED AT A RECORDING POSITION

[75] Inventor: Hideaki Kawamura, Tokyo, Japan

[73] Assignee: Canon Kabushiki Kaisha, Tokyo, Japan

[21] Appl. No.: 709,722

[22] Filed: Mar. 8, 1985

[30] Foreign Application Priority Data

| Mar. 14, 1984 | [JP] | Japan | 59-49577 |
| Mar. 23, 1984 | [JP] | Japan | 59-56694 |
| Jun. 27, 1984 | [JP] | Japan | 59-132299 |

[51] Int. Cl.⁴ .................... H04N 1/40; H04N 1/04; H04N 1/46; G03F 3/08
[52] U.S. Cl. .................... 358/280; 358/75; 358/80; 358/285
[58] Field of Search .............. 358/75, 78, 80, 280, 358/283, 285, 256

[56] References Cited

U.S. PATENT DOCUMENTS

| 4,305,094 | 12/1981 | Yamada | 358/80 |
| 4,371,260 | 2/1983 | Yoshimoto et al. | 358/75 |
| 4,402,015 | 8/1983 | Yamada | 358/80 |
| 4,410,909 | 10/1983 | Ueda et al. | 358/75 |
| 4,447,833 | 5/1984 | Sano et al. | 358/283 |
| 4,467,364 | 8/1984 | Konagaya | 358/80 |
| 4,472,736 | 9/1984 | Ushio et al. | 358/75 |
| 4,622,582 | 11/1986 | Yamada | 358/80 |

FOREIGN PATENT DOCUMENTS

| 145144 | 11/1979 | Japan | 358/280 |
| 39168 | 3/1983 | Japan | 358/280 |
| 178667 | 10/1983 | Japan | 358/280 |
| 37878 | 2/1985 | Japan | 358/75 |
| 2073987 | 10/1981 | United Kingdom | 358/75 |
| 2133657 | 7/1984 | United Kingdom | 358/75 |

*Primary Examiner*—James J. Groody
*Assistant Examiner*—Randall S. Svihla
*Attorney, Agent, or Firm*—Fitzpatrick, Cella, Harper & Scinto

[57] ABSTRACT

An image processing apparatus can rapidly produce a hard copy of a video image by setting parameters for processing an input image signal while a record medium is being advanced to an initial recording position. The parameters which are set are upper and lower limits for normalizing the input image signal, and are determined by performing histogram processing on the input image signal. In addition, the processing apparatus may include a plurality of combined normalization and gamma correction reference tables for processing the input image signal. One of the plurality of combined reference tables is selected on the basis of the upper and lower limits determined by the histogram processing of the input image signal. Alternatively, separate normalization and gamma correction reference tables may be used.

7 Claims, 18 Drawing Figures

IMAGE PROCESSING APPARATUS FOR RAPID PRODUCTION OF A HARD COPY OF A VIDEO IMAGE IN WHICH INPUT IMAGE SIGNAL PROCESSING PARAMETERS ARE SET WHILE A RECORD MEDIUM IS BEING POSITIONED AT A RECORDING POSITION

BACKGROUND OF THE INVENTION

1. Field of the Invention

The present invention relates to an image processing apparatus suitable for making a hard copy based on an input image signal.

2. Description of the Prior Art

Figure 1:
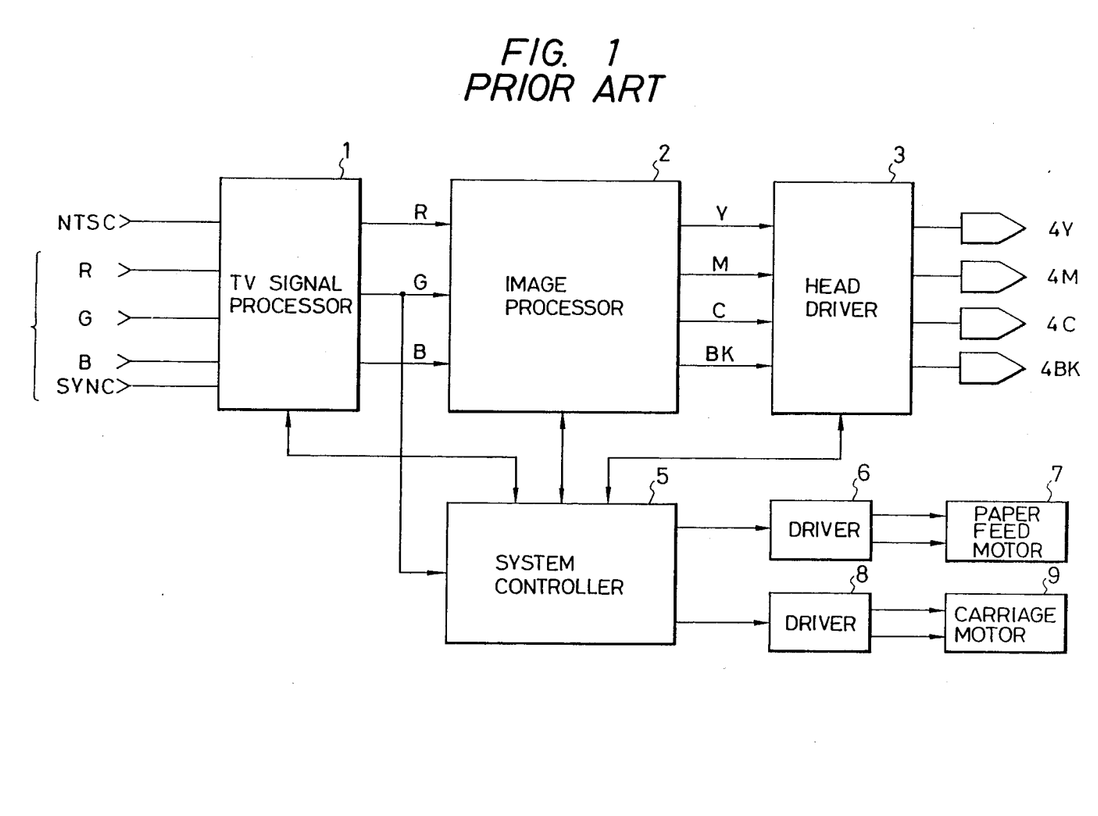
FIG. 1 is a system block diagram of a prior art video printer.

FIG. 1 is a block diagram of a prior art video printer, to which the input signal may be either an NTSC signal or R·G·B-SYNC signals. R, G and B digital signals which are A/D converted in a television signal processor 1 are supplied to an image processor 2. The image processor 2 carries out RGB-CMY conversion, masking and undercolor elimination to produce C, M, Y and BK color data. The color data are then supplied to a head driver 3 which drives ink jet heads 4Y, 4M, 4C and 4BK to record an image.

The print heads 4 are moved left and right in a main scan direction by a carriage motor 9 and a paper is fed in a line feed direction by a paper feed motor 7 for each print line.

Figure 2:
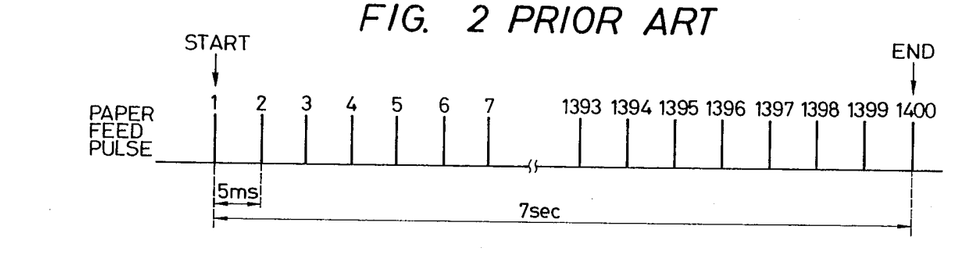
FIG. 2 shows a timing for paper feed in the prior art video printer.

In this video printer, when a cut sheet is used, it is necessary to set the paper at a record position before the print operation is started. A timing chart therefor is shown in FIG. 2. Assuming that 1,400 pulses are required to feed out the paper from a paper cassette and feed the paper to the predetermined record position by the paper feed motor 7 and an upper limit of a drive frequency of the paper feed motor (pulse motor) is 5 ms, 7 seconds ($=1,400$ pulses$\times 5$ ms) are required to set the paper.

Figure 3:
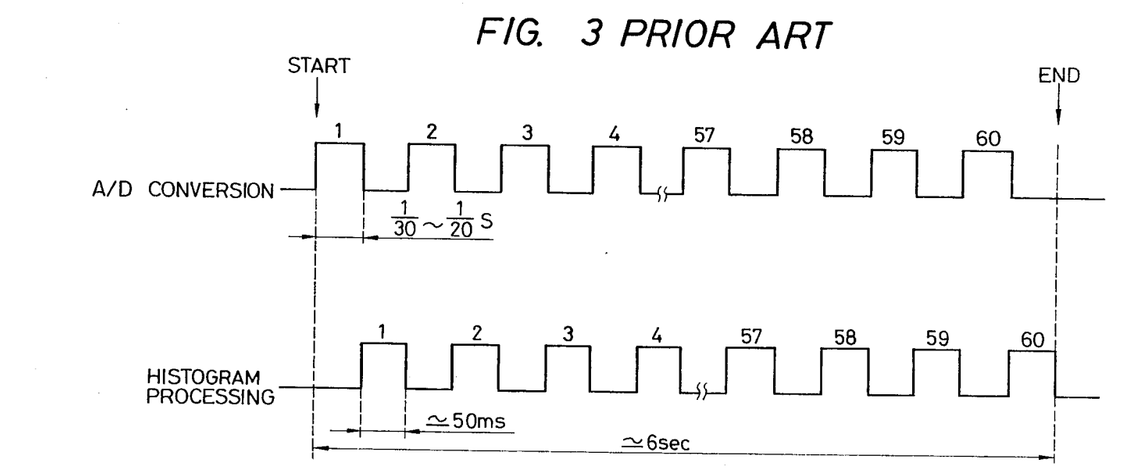
FIG. 3 shows a timing for producing a histogram.

In a full-color video printer, it is required to produce an optimum image in accordance with the characteristics of a specific image, and an image having a high tonality is particularly required. Accordingly, normalization is usually effected in order to expand a tonality range for the input video signal. In the normalization, lower and upper limits for the input level of the input video signal are set. It is rare that the input video signal is uniformly distributed over the entire range of density, and it is usually distributed non-uniformly in a high or low density area. It is, therefore, necessary to set the lower and upper limits in accordance with the input video signal. However, since manual adjustment is governed by feeling and experience of an operator, it is difficult to attain an optimum adjustment. Manual adjustment is difficult to attain not only for setting of the upper and lower limits but also for gamma conversion characteristics. In order to attain automatic adjustment, it is necessary to sample a number of points on the input video signal to make a histogram of input video signal levels and set the upper and lower limits based on the overall histogram. The histogram processing may be done for the entire screen. When the screen comprises 480 vertical dots$\times 640$ horizontal dots, the sample points may be at every tenth horizontal dot line. The image signal of the histogram is usually produced based on a luminance level ($Y=0.59G+0.30R+0.11B$) but there is no essential difference even if it is produced based on only G. Histograms of G signal data at every tenth dot line are produced. A timing chart therefor is shown in FIG. 3. Assuming that a start signal for one line of A/D conversion is supplied to the television signal processor and signals are sampled vertically, the A/D conversion is completed in $1/60 \sec \times 3=1/20$ sec at maximum and $1/60 \sec \times 2=1/30$ sec at minimum. One line (480 vertical dots) of A/D converted data have been stored in a line memory (not shown). The image data is read into the system controller (CPU) 5 which produces the histogram. Assuming that the time required for this processing is 50 ms at maximum, 60 lines$\times (50+50)=6,000$ ms or 6 seconds, at maximum, are required in total.

The setting of the record medium to the record position and the setting of parameters for processing the video signal are essential prior to the initiation of recording, and if they are performed sequentially, $7+6=13$ seconds are required. Thus, a long recording time is required.

SUMMARY OF THE INVENTION

It is an object of the present invention to provide a video image recorder which eliminates an above-mentioned prior art drawback.

It is another object of the present invention to provide a video image recorder which has a reduced total recording time.

It is still another object of the present invention to provide an image signal processing apparatus which allows automatic setting of characteristics for normalization or $\gamma$-conversion and has a reduced operation time for normalization.

The other objects of the present invention will be apparent from the following detailed description of the invention.

BRIEF DESCRIPTION OF THE DRAWINGS

FIGS. 5 to 8 show program flow charts stored in a ROM of a system controller 5' of FIG. 4, in which

DETAILED DESCRIPTION OF THE PREFERRED EMBODIMENTS

Figure 4:
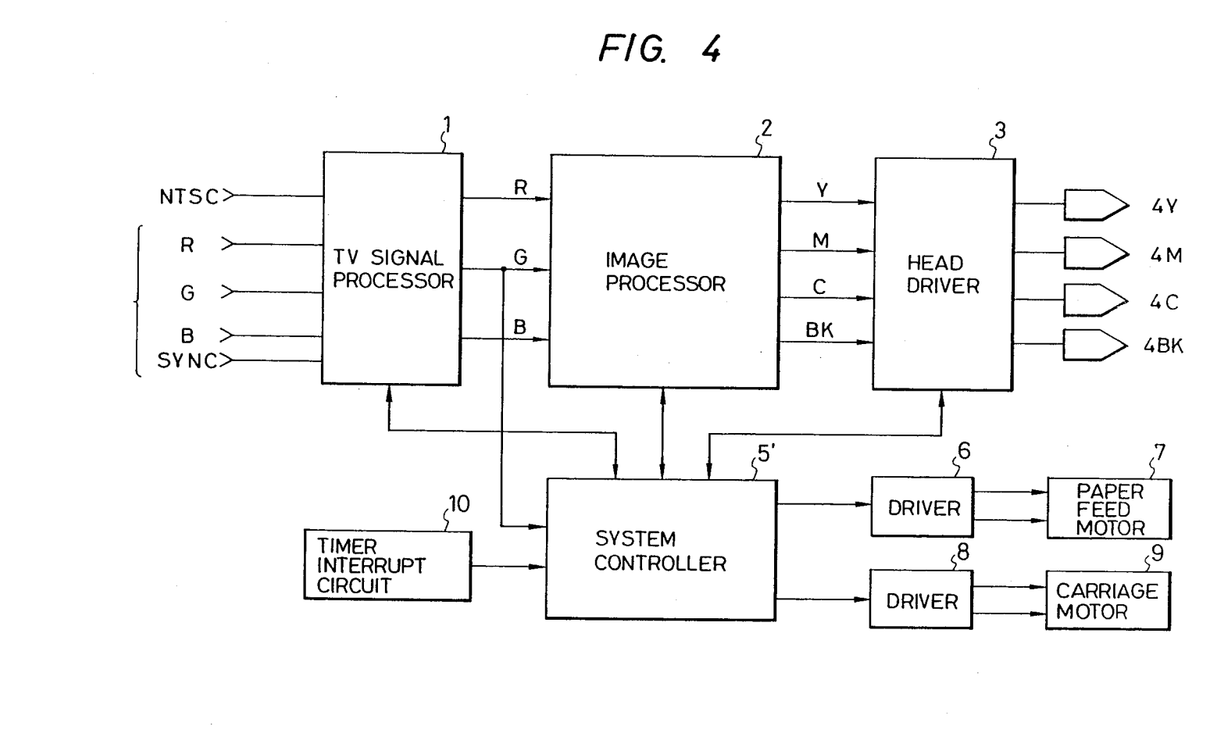
FIG. 4 is a system block diagram of a video printer of one embodiment of the present invention.

FIG. 4 is a control block diagram of a video printer in accordance with one embodiment of the present invention. The like elements to those shown in FIG. 1 are designated by like numerals. Numeral 10 denotes a timer interrupt circuit which issues an interruption signal at a time interval of 5 ms, and the interruption signal is supplied to an interrupt input terminal of a system controller 5' which comprises a CPU, a ROM and a RAM.

Figure 5:
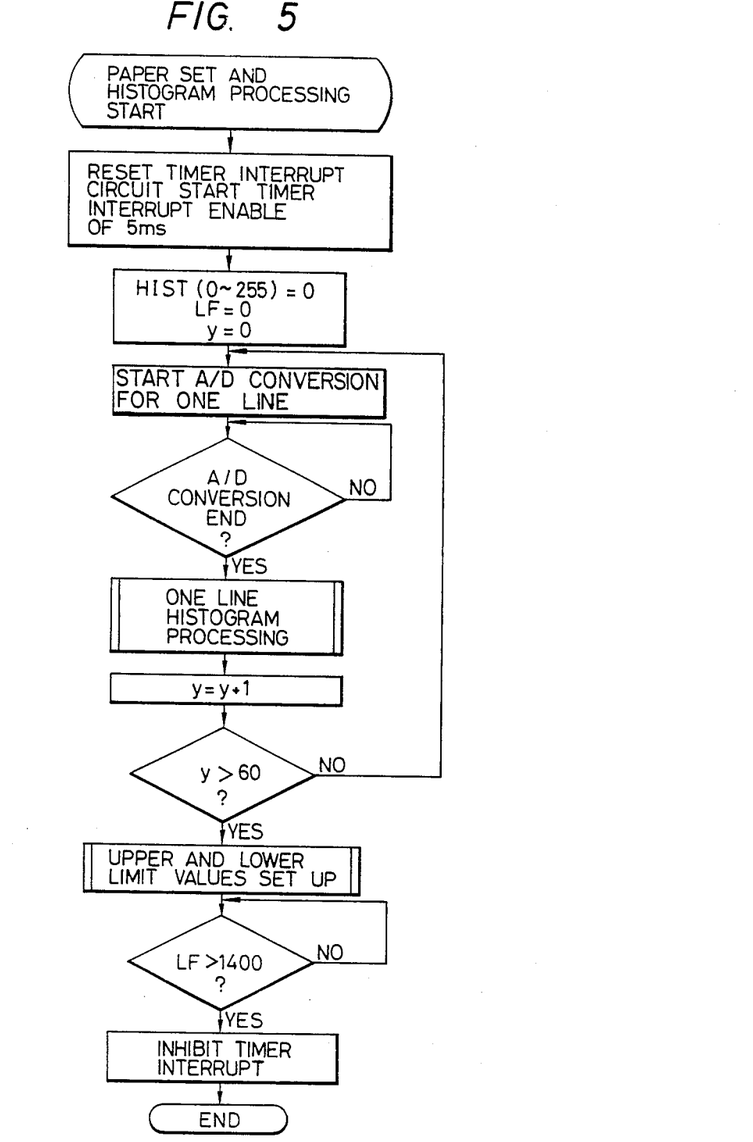
FIG. 5 shows a main flow chart.
Figure 6:
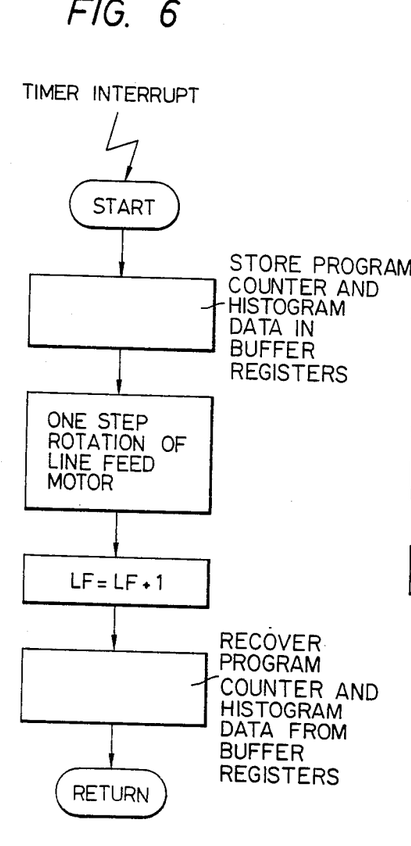
FIG. 6 shows a timer interrupt processing routine.
Figure 7:
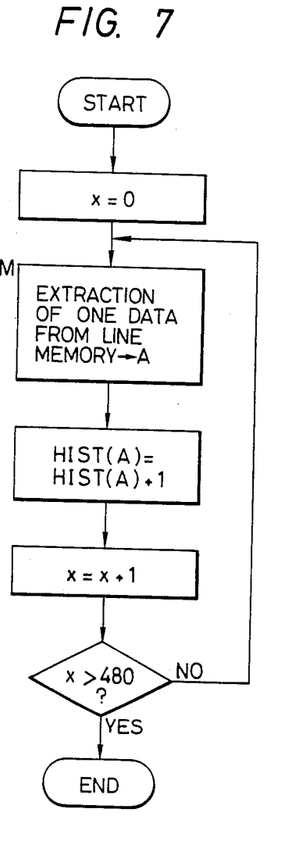
FIG. 7 shows a one-line histogram processing routine and FIG. 8 shows lower and upper limit setting routine.
Figure 8:
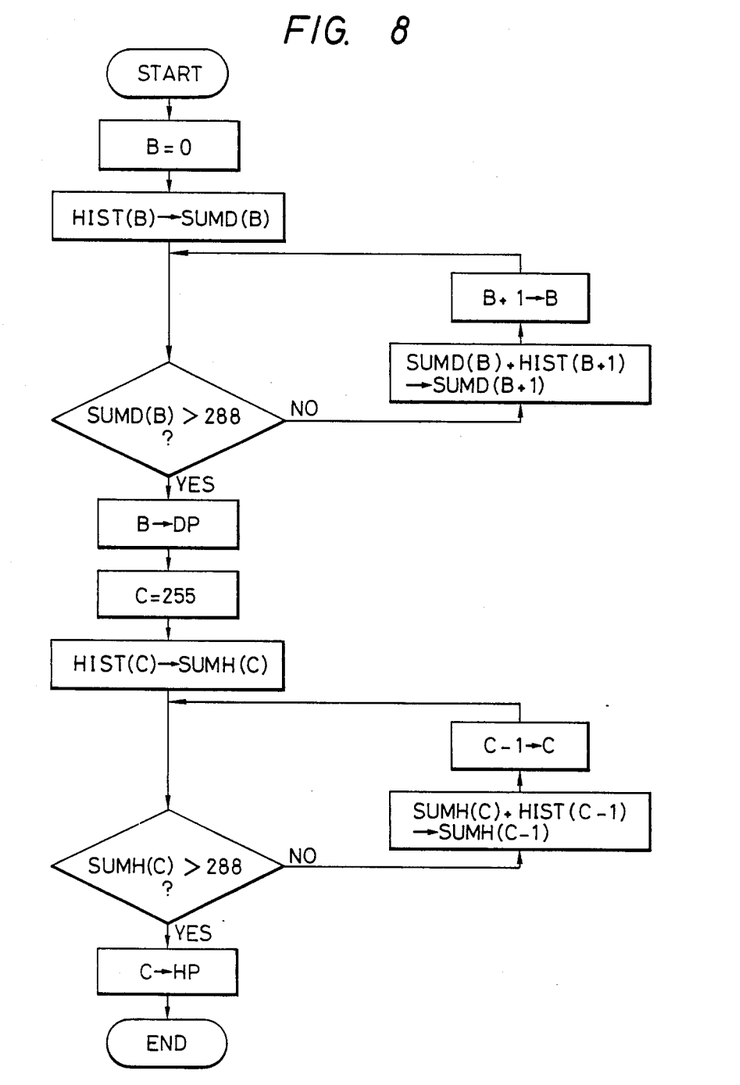

FIG. 5 shows a main flow chart for setting a record paper and producing a histogram, FIG. 6 shows a timer interrupt processing routine, FIG. 7 shows one-line histogram processing routine, and FIG. 8 shows lower and upper limit setting routine. Those programs are contained in the ROM in the system controller 5'. FIGS. 7 and 8 show flow charts of operations.

Referring to FIG. 5, a main routine operation is explained.

Immediately after the start of the program, the initialization to activate the timer interrupt circuit 10 and the acceptance of the interrupt signal are started. The time interval of the interrupt signal is set to 5 ms to comply with the highest response frequency of the paper feed pulse motor 7. Then, frequencies HIST(0)~HIST(255), number LF of paper feed pulses and number y of sampling lines are reset to zero. The A/D conversion is started and a digital data for each A/D conversion is stored in a line memory in the television signal processor 1. At the end of one line (480 vertical dots) of A/D conversion, one-line histogram processing (FIG. 7) is carried out to determine a luminance distribution of the input video signal. After the A/D conversion and histogram processing for one line, similar processing is effected for the next line and it is repeated for each of 60 lines.

After the processing for 60 lines, the lower limit DP and the upper limit HP are set based on the luminance distribution. This processing routine is shown in FIG. 8. When the number LF of paper feed pulses generated during the main routine by the timer interruption reaches 1,400, timer interruption is inhibited and the paper setting is terminated.

The timer interrupt routine is explained with reference to FIG. 6. The program counter the main routine and the histogram data representing the luminance distribution are stored in buffer registers. Then, one pulse is supplied to the paper feed pulse motor 7 to rotate the motor 7 by a predetermined angle and feed the record paper by one step. The number LF of pulses is incremented by one, the program counter and the histogram data are recovered from the buffer registers and then the process returns to the program step in the main routine designated by the recovered program counter.

The time required for the timer interrupt routine of FIG. 6 is approximately 0.1 ms and a total time required for sending out 1,400 pulses is 140 ms, which is significantly shorter than the time required for setting the paper when the paper setting and the histogram processing are separately performed.

Figure 9:
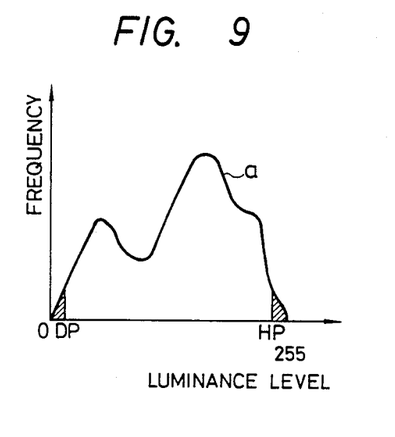
FIG. 9 shows a histogram.

Referring to FIG. 7, one-line histogram processing routine is explained. The A/D converted intensity data are read out of the line memory, one at a time, HIST(A) which indicates the number of times for each of values A (0~255) of the luminance data is incremented by one, and the above steps are repeated until one line of processing is completed. This processing is repeated for each of 60 lines so that a luminance distribution a shown in FIG. 9 is derived.

Referring to FIG. 8, the setting routine for the lower limit (dark point) and the upper limit (highlight point) is explained.

The lower limit (dark point) DP is set to 1% luminance level of the total number of times (60×480=28,800) as counted from the lowest luminance position and the upper limit (highlight point) HP is set to 1% luminance level of the total number of times as counted from the highest luminance position.

The number of times HIST of the luminance levels are sequentially summed starting from the luminance level 0 to produce an accumulation of numbers of times SUMD(B). The luminance level when SUMD(B) exceeds 288 (1% of total number of times) is set as the lower limit DP. On the other hand, the numbers of times HIST are sequentially summed starting from the luminance level 255, and the luminance level when the accumulation of the numbers of times SUMH(C) exceeds 288 is set as the upper limit HP.

The lower and upper limits DP and HP thus set are used in the actual recording operation. For example, if the input signal level is Din the output signal Dout is set in the following manner:

$$Dout = \frac{Din - DP}{HP - DP}$$

Din<DP, then Dout=DP, and
Din>HP, then Dout=HP

In this manner, the input video signal is normalized.

Figure 10:
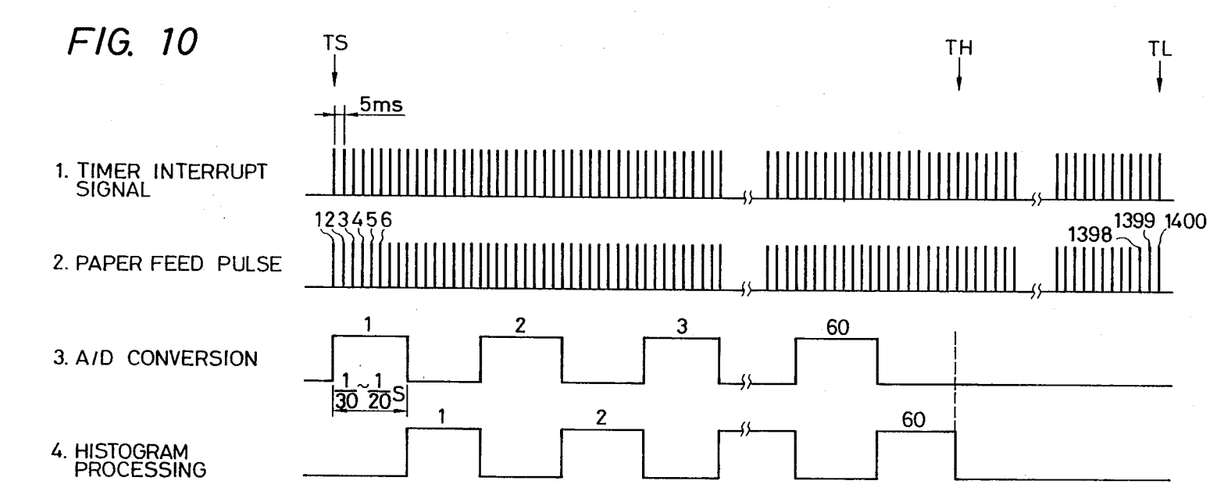
FIGS. 10 and 11 show timing charts.
Figure 11:
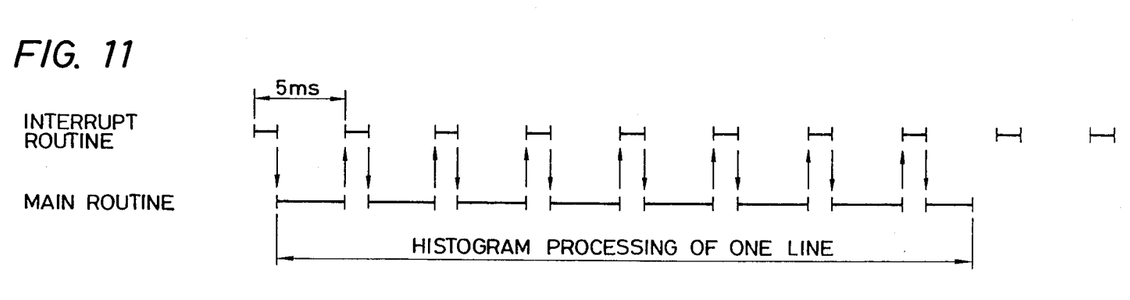

FIG. 10 shows the timer interrupt signal, the paper feed pulse and a time chart of A/D conversion and histogram processing, and FIG. 11 shows a relationship between the interrupt routine and the main routine in the CPU.

The time interval of the interrupt signals of the interrupt timer may be variably set in accordance with the motor and the load to the motor.

In the present embodiment, the time required to set the paper is longer than the time to set the lower and upper limits or the parameters required by the signal processor 1 in the record operation. The total time can also be shortened when the relation is opposite.

Cut paper is used as the record paper in the present embodiment. When roll paper is used and the feed to the record position is required, for example, during the initial idle feed or for a space between images, the present invention is also applicable.

In addition to the lower limit and the upper limit, a gradient of a gamma correction curve may be included in the parameters. They may be set in parallel with the feeding of the record paper to the record position, as are done in the above embodiment.

As described hereinabove, since the feeding of the record medium to the record position and the setting of the parameters necessary for the processor to process the video signal are effected in parallel, the total recording time can be significantly reduced. The present invention is applicable not only to the ink jet printer but also to various types of printers.

An embodiment for setting the upper limit, the lower limit and the γ-conversion characteristic for the normalization is now explained.

Figure 12:
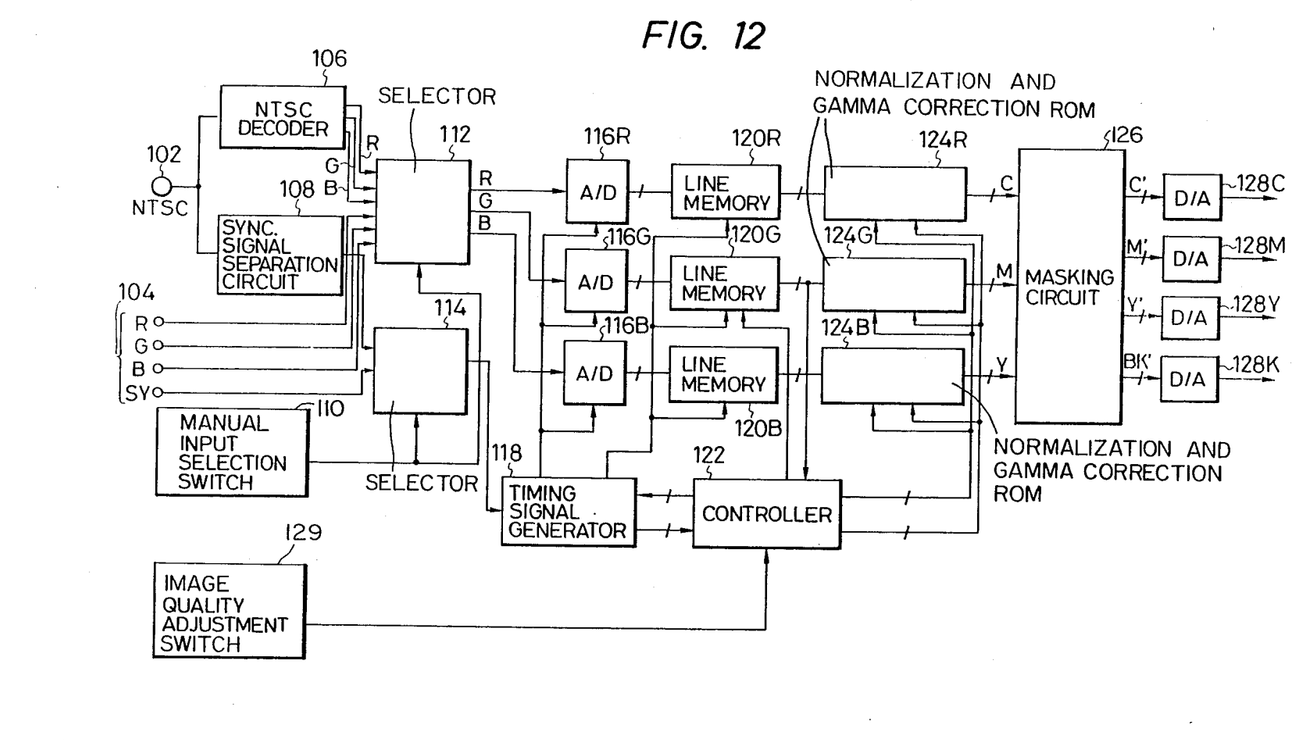
FIG. 12 is a control block diagram of an image processor in a second embodiment of the present invention.

FIG. 12 is a control block diagram of an image processing apparatus in accordance with a second embodiment of the present invention.

An NTSC TV signal applied to an NTSC input terminal 102 is decoded by an NTSC decoder 106 into R, G and B chrominance signals, which are then applied to a selector 112. Vertical and horizontal synchronization signals are separated from the NTSC TV signal by a synchronization separation circuit 108, and the synchronization signals are supplied to a selector 114. R, G and B chrominance signals applied to R, G and B input terminals 104 are directly applied to the selector 112, and a synchronization SY is also directly applied to the selector 114. Input signal sources designated by a manual input selection switch 110 is selected by the selectors 112 and 114. The selected R, G and B chrominance signals are supplied to analog/digital converters (A/D converters) 116R, 116G and 116B. The selected synchronization signal is supplied to a timing signal generator 118, which generates a sampling signal for the A/D converters 116 and input/output clocks for line memories 120R, 120G and 120B to be described later. On the other hand, the analog chrominance signals applied to the A/D converters 116 are converted to digital signals, which are supplied to line memories 120. Output signals from the line memories 120 are supplied to normalization ROM's 124R, 124G and 124B so that R→C, G→M and B→Y conversions, a gamma correction and the normalization are simultaneously carried out. The characteristic of the normalization is controlled by a controller 122. This operation will be described later.

The C, M and Y data converted by the normalization ROM's 124 are supplied to a masking circuit 126 where spurious color elimination and undercolor elimination are carried out to produce chrominance signals C', M', Y' and BK', which are converted to analog signals by digital/analog converters (D/A converters), 128C, 128M, 128Y and 128BK. The analog signals are supplied to ink jet heads through ink jet head drivers to print a desired image.

The operation of the normalization ROM's 124 is now explained. The gamma correction circuits 124 perform the logarithmic conversion from RGB to CMY, gamma correction and normalization.

Figure 13:
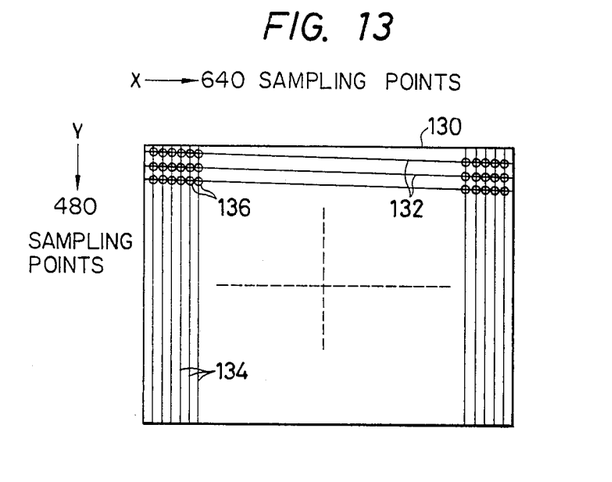
FIG. 13 illustrates sampling.

The conversion is effected prior to the image formation in the following manner. FIG. 13 shows a television screen 130. Numeral 132 denotes horizontal scan lines, numeral 134 denotes a sampling direction, numeral 136 denotes a sampling point, X denotes a horizontal scan direction and Y denotes a vertical direction. The sampling by the A/D converter 116 is effected vertically in the horizontal scan direction X, and the position is sequentially shifted horizontally so that the entire screen is sampled. In the actual screen formation, 640 sampling points in the X direction and 480 sampling points in the Y direction are used. However, not all sampling information is required for setting the highlight point and the dark point for the gamma correction and the normalization, and 64 points extending in the X direction at every tenth vertical line and 480 points extending along the Y direction are used.

Since approximately 60% of the luminance signal is occupied by the green (G) component, only the sampling data for the green signal G is necessary for the above setting.

Figure 14:
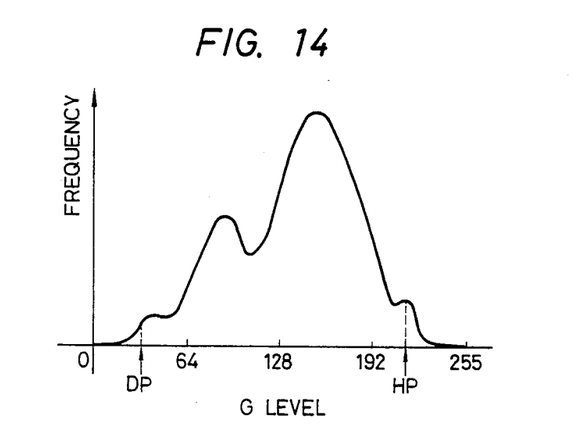
FIG. 14 shows a histogram.

Assuming that the number of output bits from the A/D converter 116 is eight, the green digital data may assume one of the values 0~255. The frequency distribution thereof is shown in FIG. 14. From the frequency distribution, an integration is calculated, and a point at which the integration is 1% of the total is set as the dark point DP (highest reproducible density), and a 99% point is set as the highlight point HP (lowest reproducible density). The percentages for the points for setting DP and HP are selectable by an image quality switch 129 of FIG. 12 so that any image quality such as a dark image or light image can be produced.

It is desirable that the gamma correction and the normalization are effected in accordance with the set points DP and HP, but a high speed computer is needed to execute the operation during the formation of the image. In the present embodiment, 64 normalization reference tables are stored in the normalization ROM's 124. There are eight dark points (lower limits) DP1~DP8 and eight highlight points (upper limits) HP1~HP8 so that 64 tables are included. A reference table is selected by the control circuit 122 based on the dark point DPB which is closest to the set dark point DP and the highlight point HPB which is closest to the highlight point HP. Input data R, G and B and output data C, M and Y calculated in accordance with the following formulas are stored in the normalization ROM's 124. Normalization ROM 124R:

$$C = \frac{\log(HPB) - \log R}{\log(HPB) - \log(DPB)} \times 255$$

where $C = 255$ if $R \leq (DPB)$ $C = 0$ if $(HPB) \leq R$

Normalization ROM 124G:

$$M = \frac{\log(HPB) - \log G}{\log(HPB) - \log(DPB)} \times 255$$

where $M = 255$ if $G \leq (DPB)$ $M = 0$ if $(HPB) \leq G$

Normalization ROM 124B:

$$Y = \frac{\log(HPB) - \log B}{\log(HPB) - \log(DPB)} \times 255$$

where $Y = 255$ if $B \leq (DPB)$ $Y = 0$ if $(HPB) \leq B$

In this manner, the YMC conversion, gamma conversion and normalization for the input chrominance signals R, G and B are effected in parallel.

Figure 15:
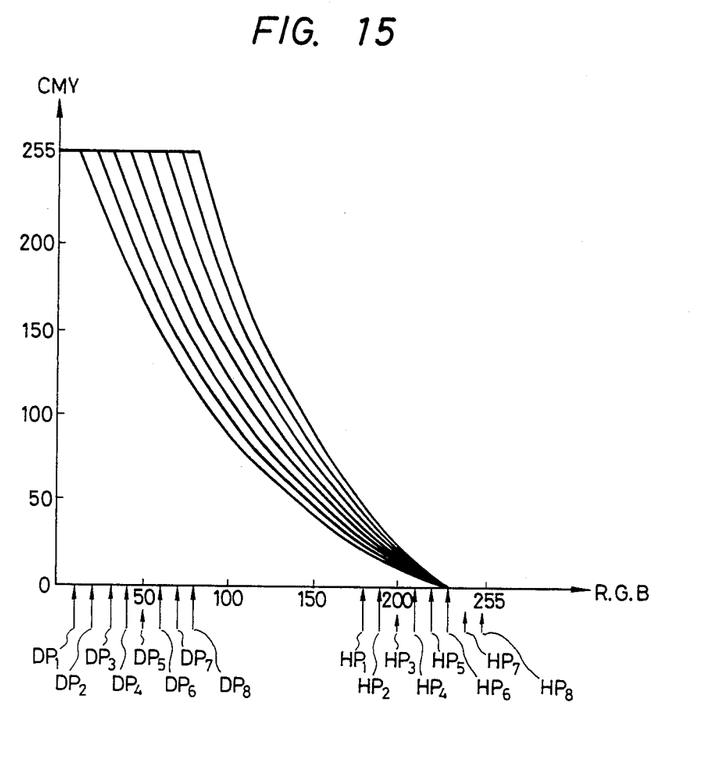
FIG. 15 shows a $\gamma$-correction curve.

FIG. 15 shows correction curves represented by the above formulas. An abscissa represents data of the input chrominance signals R, G and B, and an ordinate represents data of the output chrominance signal C, M and Y. FIG. 15 shows correction curves for DPB when HP5 is selected as HPB. In the present embodiment, 64 correction curves are provided as described before.

Figure 16:
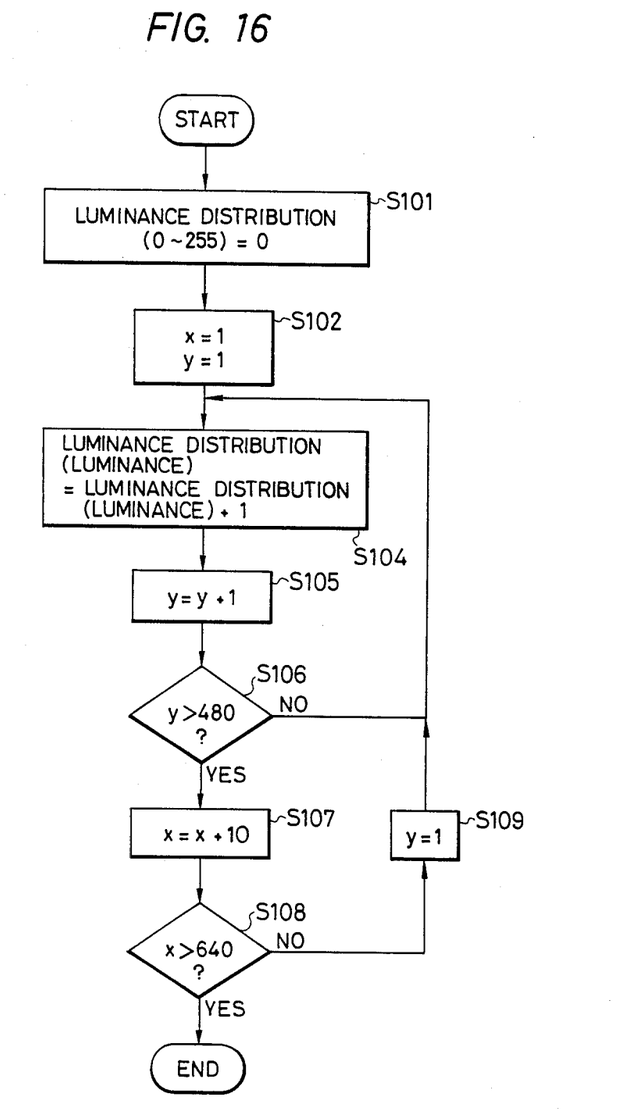
FIGS. 16 to 18 show program flow charts stored in a controller 122 of FIG. 12.
Figure 17:
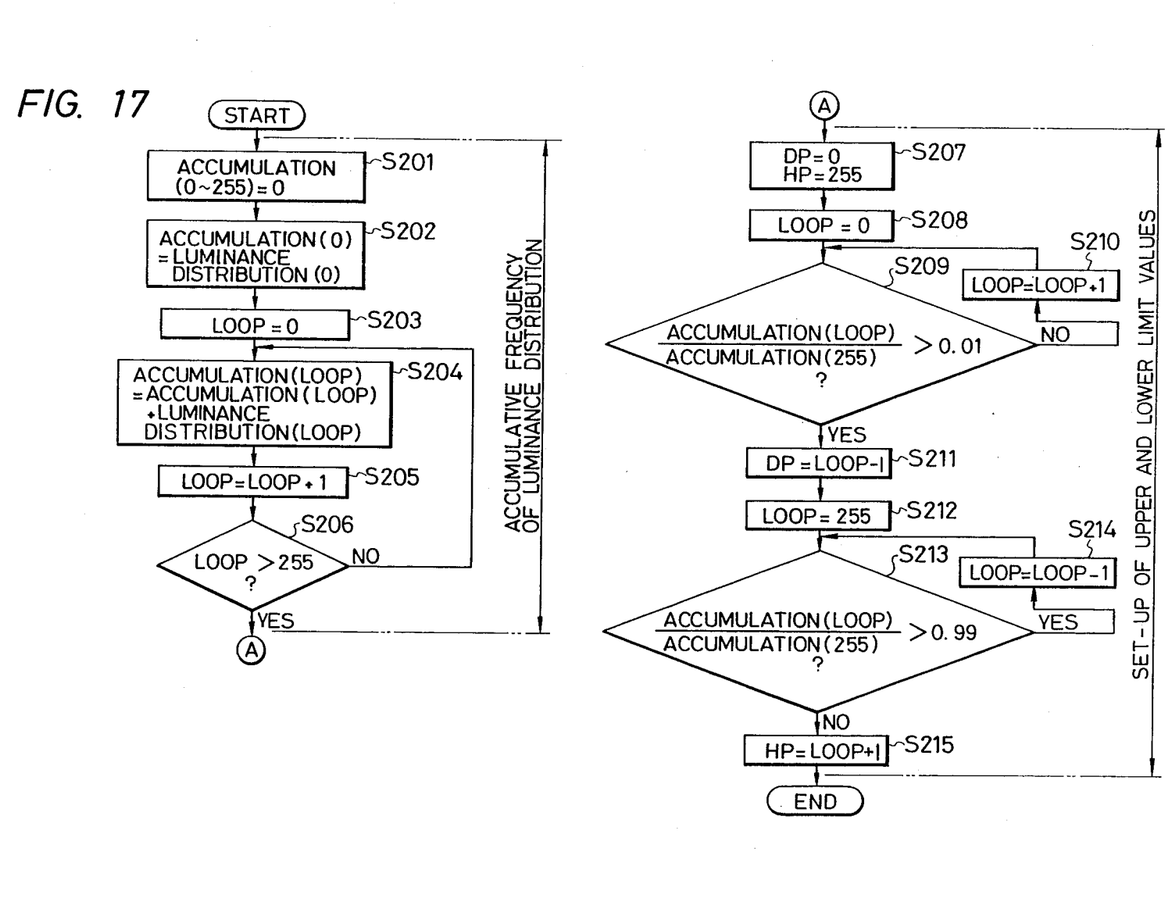
Figure 18:
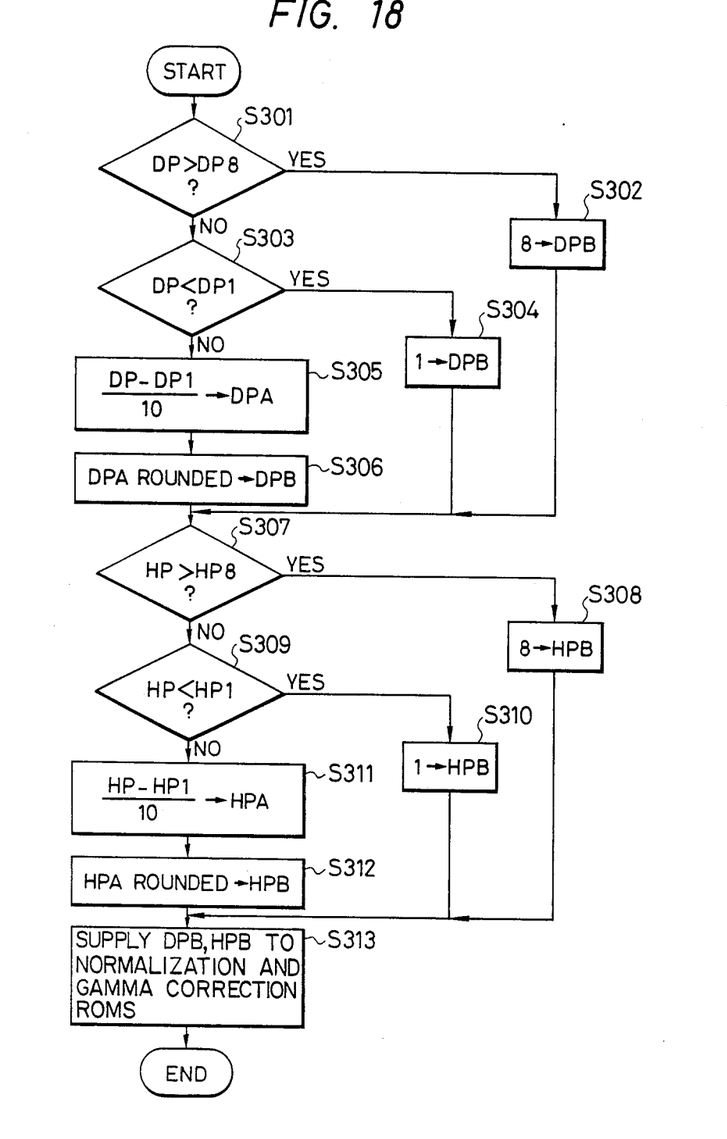

Referring to FIGS. 16–18, control programs stored in the control circuit 122 of FIG. 12 are explained.

First, referring to FIG. 16, a luminance distribution of the luminance signal for one frame is obtained in the following manner. In FIG. 16, the luminance distribution (0~255) represents the frequency of occurrence of the A/D converted (0~255) luminance level. This data is stored in the RAM in the control circuit 122. In a step S101, a data area at which the frequency of occurrence is stored is cleared. In a step S102, initialization for loop counts in x and y directions for the entire screen is effected. In a step S104, the frequency of occurrence of the luminance level is incremented by one. In a step S105, the loop count in the y direction is effected, and if y>480 (step S106), the loop count in the x direction is effected in a step S107, and if x>640, the luminance distribution processing for one frame is terminated. In a step S109, the loop count in the y direction is initialized.

FIG. 17 is a flow chart for determining the set dark point DP and the set highlight point HP for the input signal based on the luminance distribution. In steps S201–S206, accumulation of frequencies of occurrence of the luminance distribution, that is, accumulation (0~255) is obtained, and in steps S207-S215, the DP and HP for the input signal level are obtained. The accumulation (255) indicates a total accumulation of frequencies of occurrence. The number of pixels is 64×480. In the present embodiment, DP and HP are a point which is smaller than 1% of the total accumulation of the luminance distribution and a point which is larger than 99% of the total accumulation, respectively. More specifically, DP is set to a luminance level immediately before 1% of the total accumulation when the accumulation is searched in an ascending order, and HP is set to a luminance level immediately before 99% of the total accumulation when the accumulation is searched in a descending order. In the present embodiment, the DP and HP obtained in the above steps are commonly used to the R, G and B signals.

Turning back to FIG. 17, in a step S201, the data area in the RAM in which the accumulation (0~255) is stored is cleared. In a step S202, initialization of the accumulation of frequencies of occurrence is effected. That is, the frequency of occurrence for the luminance 0 is set. In a step S203, the loop count is initialized. In a step S204, the luminance distribution in the current loop (the frequency of occurrence of the current luminance level) is added to the accumulation of the frequencies of occurrence for the previous loop. In a step S205, the loop count is incremented by one. The above steps are repeated until the loop count exceeds 255 (step S206).

In order to determine DP and HP, DP and HP are initialized in a step S207, and the loop count for determining DP is initialized in a step S208. In steps S209 and S210, accumulation (loop)/accumulation (255) is calculated, and if a quotient is smaller than 0.01, the loop count is sequentially incremented by one and the above operation is repeated, and if the quotient is no smaller than 0.01, the immediately previous loop count is set as DP (step S211). In a step S212, the loop count for determining HP is initialized. In steps S213 and S214, a similar operation to that described above is repeated so long as the quotient is larger than 0.99, and when the quotient is no larger than 0.99, the immediately previous loop count is set as HP (step S215).

Referring to FIG. 18, a procedure for determining the processing dark and highlight points DPB and HPB based on DP and HP is explained. In a step S301, DP and DP8 are compared, and if DP is larger than DP8, DPB is set to DP8 in a step S302. Then, DP and DP1 are compared in a step S303, and if DP is smaller than DP1, DPB is set to DP1 in a step S304. In a step S305, $$\frac{DP - DP1}{10} = DPA$$

is calculated, where 10 is a difference between DPB values. In the present embodiment, as shown in FIG. 15,

DP8−DP7=DP7−DP6= ... =DP2−DP1=10

DPA thus obtained is rounded in a step S306 to obtain DPB. In this manner, the processing dark points DPB which is closest to the set dark point DP is obtained.

In steps S307-S312, the processing highlight point HPB which is closest to the set highlight point HP is obtained in a similar manner. DPB and HPB are supplied to the normalization ROM's 124R, 124G and 124B in a step S313. In this step, an actual image is formed. Since the normalization ROM's 124 comprise reference tables, the normalized outputs for the input chrominance signals are instantly produced.

In the present embodiment, the accumulation of distributions is calculated based on the green signal. However, since the actual luminance signal Y is represented by

Y=0.59G+0.30R+0.11B it is desirable to use Y. In this case, however, a longer processing time is required because of multiplication and addition times. The green component occupies approximately 60% of the luminance signal, and there is no significant difference between Y and G from experience in printing of many images.

Assuming that one reference table needs 2K-bit capacity, the normalization ROM's 124 having 64 reference tables need a 128K-bit ROM. If the least significant bit of the 8-bit input chrominance signal is neglected in composing the reference table, each reference table needs 1K-bit capacity. Thus, 128 tables may be composed and, for example, 16 processing dark points DPB and 8 highlight points HPB may be provided. If the ROM capacity is larger, more tables can be used.

In the above embodiment, the set points DP and HP are at 1% point and 99% point, respectively, of the accumulation, although other points may be selected by the manual image quality switch 129.

As described above, in accordance with the present invention, the data for the normalization and the γ-conversion are uniquely determined based on the highlight point and the dark point, and the data are stored in the reference tables. Accordingly, the time required for the normalization and the γ-conversion is shortened. Further, since various reference tables are included, optimum normalizations and γ-conversions are attained for a number of different images.

In the present embodiment, the normalization and the γ-conversion are concurrently effected in the normalization ROM, although they may be effected separately.

The present invention is not limited to the illustrated embodiments but various modifications and variations may be made within a scope of the appended claims.

What is claimed is:
1. An image recording apparatus comprising:
  recording means for recording on a record medium a visual image represented by an image signal;
  processing means for processing the image signal for recording by said recording means;
  positioning means for positioning the record medium at a recording position of said recording means;
  setting means for setting parameters necessary for said processing means to process the image signal; and
  control means for activating said setting means while said positioning means is operating.
2. An image recording apparatus according to claim 1, wherein said setting means sets upper and lower limits for normalization of the image signal.
3. An image recording apparatus according to claim 1, wherein said positioning means includes conveying means for conveying the record medium to the recording position.
4. An image recording apparatus according to claim 3, wherein said conveying means includes a stepping motor.

5. An image recording apparatus according to claim 1, wherein said setting means includes histogram processing means for producing a histogram representing a frequency distribution of each of a plurality of density levels of the image signal.

6. An image recording apparatus according to claim 5, wherein said positioning means includes a stepping motor for conveying the record medium to the recording position.

7. An image recording apparatus according to claim 6, wherein said control means alternately and repeatedly operates said histogram processing means and said stepping motor.

* * * * *